United States Patent
Woolfe et al.

(10) Patent No.: US 7,701,625 B2
(45) Date of Patent: Apr. 20, 2010

(54) CRITICAL COLOR TOLERANCE GUIDE FOR PRINTERS

(75) Inventors: Geoffrey J. Woolfe, Canandaigua, NY (US); Philip C. Rose, Sodus, NY (US)

(73) Assignee: Xerox Corporation, Norwalk, CT (US)

(*) Notice: Subject to any disclaimer, the term of this patent is extended or adjusted under 35 U.S.C. 154(b) by 863 days.

(21) Appl. No.: 11/533,958

(22) Filed: Sep. 21, 2006

(65) Prior Publication Data

US 2008/0079964 A1 Apr. 3, 2008

(51) Int. Cl.
*H04N 1/46* (2006.01)
*G03F 3/08* (2006.01)

(52) U.S. Cl. .............. 358/518; 358/3.26; 358/504; 358/523

(58) Field of Classification Search ............ 358/1.9, 358/3.26, 3.29, 500, 504, 518, 523, 527; 382/162, 167; 345/581, 589, 591, 593, 594
See application file for complete search history.

(56) References Cited

U.S. PATENT DOCUMENTS

| | | | |
|---|---|---|---|
| 6,943,915 B1* | 9/2005 | Teraue | 358/1.9 |
| 2003/0016251 A1* | 1/2003 | Kondo | 345/846 |
| 2004/0184051 A1* | 9/2004 | Bailey | 358/1.9 |
| 2006/0092442 A1* | 5/2006 | Such et al. | 358/1.9 |
| 2006/0227397 A1* | 10/2006 | Goma et al. | 358/521 |
| 2007/0097464 A1* | 5/2007 | Nielsen et al. | 358/518 |

* cited by examiner

*Primary Examiner*—James A Thompson
(74) *Attorney, Agent, or Firm*—MH2 Technology Law Group

(57) ABSTRACT

A system and method for accurately communicating color production printer color requirements include color selector software to display an interactive original document on a monitor. Tools enable navigating the displayed original document, tagging at least one critical color of the displayed document, and selection of a color tolerance in connection with each tagged critical color of the displayed document. Target builder software creates a master critical colors chart displaying only tagged critical colors for the original document, a master color aim chart, and a master color tolerance chart of critical colors and associated color tolerances identified in the displayed document. At least the critical colors chart and original document are printed. A printed master color aim chart and master color tolerance chart and customer printed charts are compared to the production end printed master critical colors chart for visually determining tolerances of customer printed charts.

20 Claims, 5 Drawing Sheets

CRITICAL COLOR TOLERANCE GUIDE FOR PRINTERS

FIELD OF THE INVENTION

The present invention generally relates to color tolerance guides, and, more particularly, accurate communication of color tolerances from a customer to a production printer.

BACKGROUND OF THE INVENTION

Most typical printing jobs include an interaction between a customer or similar source and a print production company. In particular, a customer will create a document which may then be printed in a larger production run at a production printer. For the production printer, a significant amount of time is devoted to pre-press activities such as adjustment of color and tone to achieve a close match to a proof provided by the customer. For a large production run, the production printer will recover expenses incurred in the pre-press activities by a volume of printing. However, in a short run printing job, the production printer is less likely to realize expenses due to the reduced volume of printing.

In certain printing jobs, for example short run printing jobs, it is therefore an advantage to reduce the amount of time spent on pre-press activities. A particular complication for the production printer is that while a customer proof provides a visual reference to the customer's expectations, it provides no information regarding the customer's acceptable range of color variations for the provided proof. It is typically the case that any two printers will output a common document having differing tones, hues and quality of color, possibly rendering an unacceptable document for production printing from the customer's point of view. Although a customer may send a proof to the production printer in order to provide a visual reference identifying his expectations, it does not indicate a tolerance for mismatch or color variations that will likely occur at the production printer's unit. For a typical printing job, the time between selection and final press may also include providing a return proof to the customer for final approval.

Color tolerances are difficult to specify in the context of a document and it is further likely that the tolerances may be different for different parts of the document. For example, a document containing a graphic of a company trademark is likely to have very tight color tolerances, while the colors used in a pie chart or histogram may have a very loose color tolerance. Further, color tolerances can vary between different parts of an image. For example, skin tones may have a tighter tolerance than the colors of objects such as clothing or automobiles. Finally, color tolerances may be dependent upon a final intended use of the document. For example, advertisers may be more concerned about the color tolerances on their product than about the colors of background or models. Likewise, pictures of sports team uniforms may require a more accurate reproduction than other elements of the picture.

Accordingly, there is a need to overcome these and other color management problems and to provide an efficient and economically practical method for communicating color tolerances within a source document to an end production printer. Further, any method or system for overcoming the problem should be simple for the customer to implement, without the need for extensive training or explanation.

SUMMARY OF THE INVENTION

In accordance with the present teachings, a method for identifying color tolerances in a pre-press proof is provided. The exemplary method can include providing an interactive graphical user interface and viewing the pre-press proof in the graphical user interface as a document. In a viewing mode a user tags selected portions of the document containing a critical color and assigns a color accuracy tolerance level for each of the tagged portions of the document. A series of color patch charts are automatically generated in response to assigning the color accuracy tolerance level, the series of color patch charts visually specifying color tolerances corresponding to the tagged portions of the document. The user may optionally adjust assigned tolerance levels further prints a hard copy of the pre-press proof and selected ones of the color patch charts.

In accordance with the present teachings, a system for accurately communicating color requirements from a customer to a production printer is provided. The exemplary system can include a graphical user interface, a color selector for generating a document and displaying the generated document on the graphical user interface, and a tool for navigating the generated document and identifying critical colors of the generated document. The color selector further enables selection of a color tolerance in connection with each identified critical color of the generated document. A target builder, responsive to the color selector, automatically generates a series of color patch charts representing critical colors identified in the generated document. Selected hard copies of the color patch charts are compared to a test print hard copy of the generated document for visually determining if the test print is within the selected color tolerance.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

In a typical customer-printer relationship, a customer has prepared a source document for duplicating by a printer and the source document may exist as, for example, a portable document format (PDF) file. Normally, the customer may send the source document file to his own printing system to create a hardcopy proof. If the customer is pleased with the proof, he sends both the PDF file and the hardcopy proof to the production printer. The proof represents a color reproduction aim for the production printer. However, there is the unspoken expectation that the production printer can not make a perfect reproduction of the proof. Accordingly, the production printer may be required to independently determine how closely to match the proof. The issue of color management is further complicated by the fact that different parts of the document, or different colors in the document, may have different color tolerance levels.

The exemplary disclosure enables the customer to define color tolerances in a source document for use by the production printer.

Figure 1:
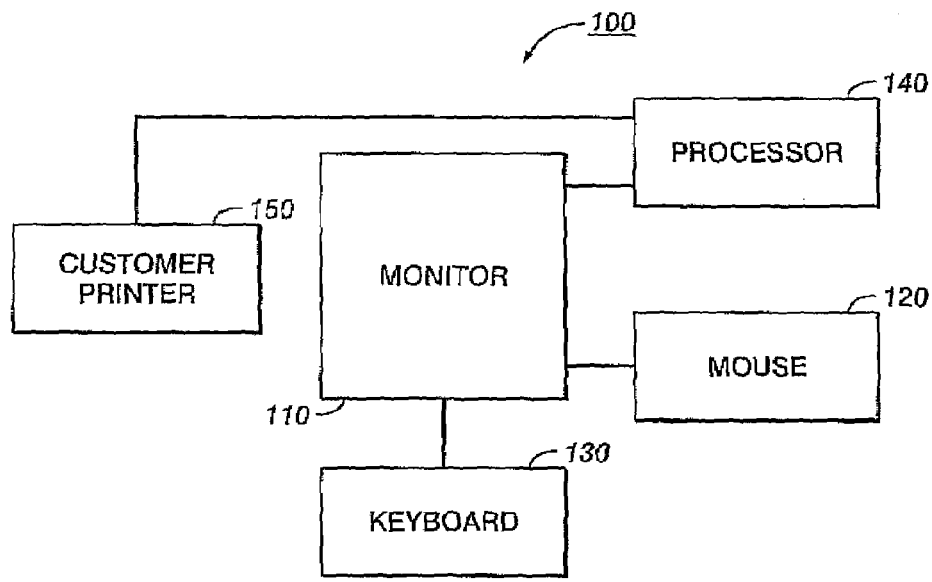
FIG. 1 depicts architecture of a user interface in accordance with exemplary embodiments of the present teachings.
Figure 5:
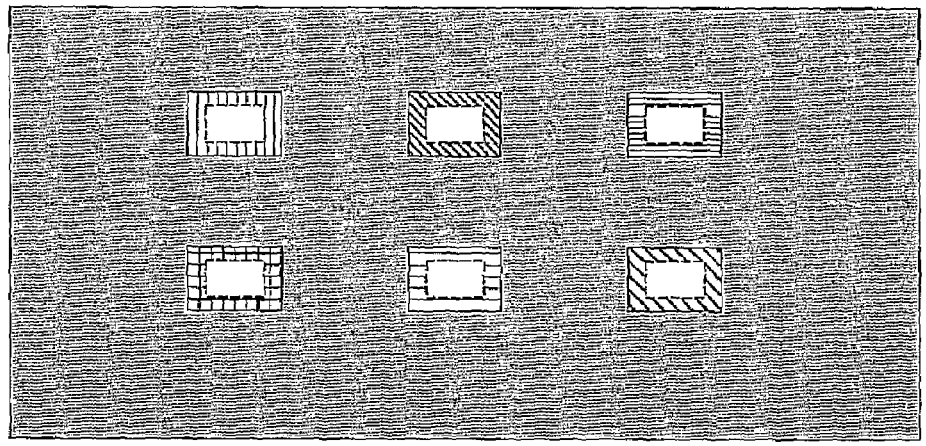
FIG. 5 depicts a program generated color aim chart in accordance with embodiments of the present teachings.
Figure 6:
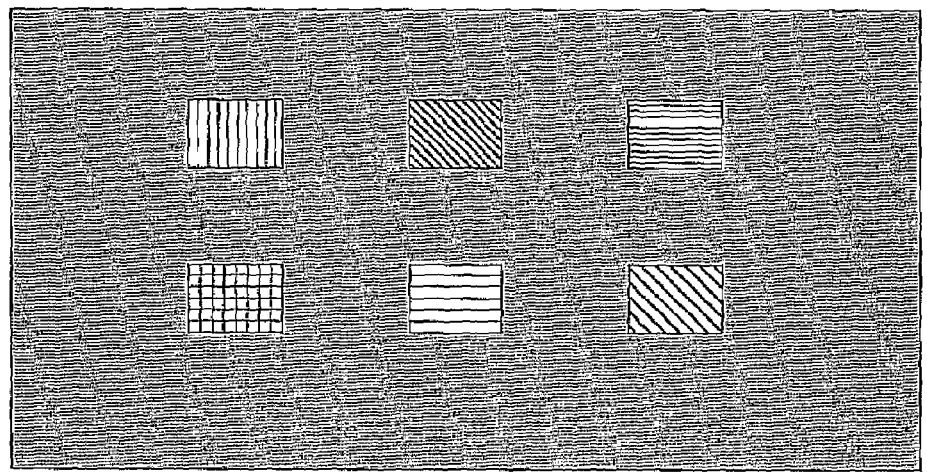
FIG. 6 depicts a program generated critical colors chart in accordance with embodiments of the present teachings.
Figure 7:
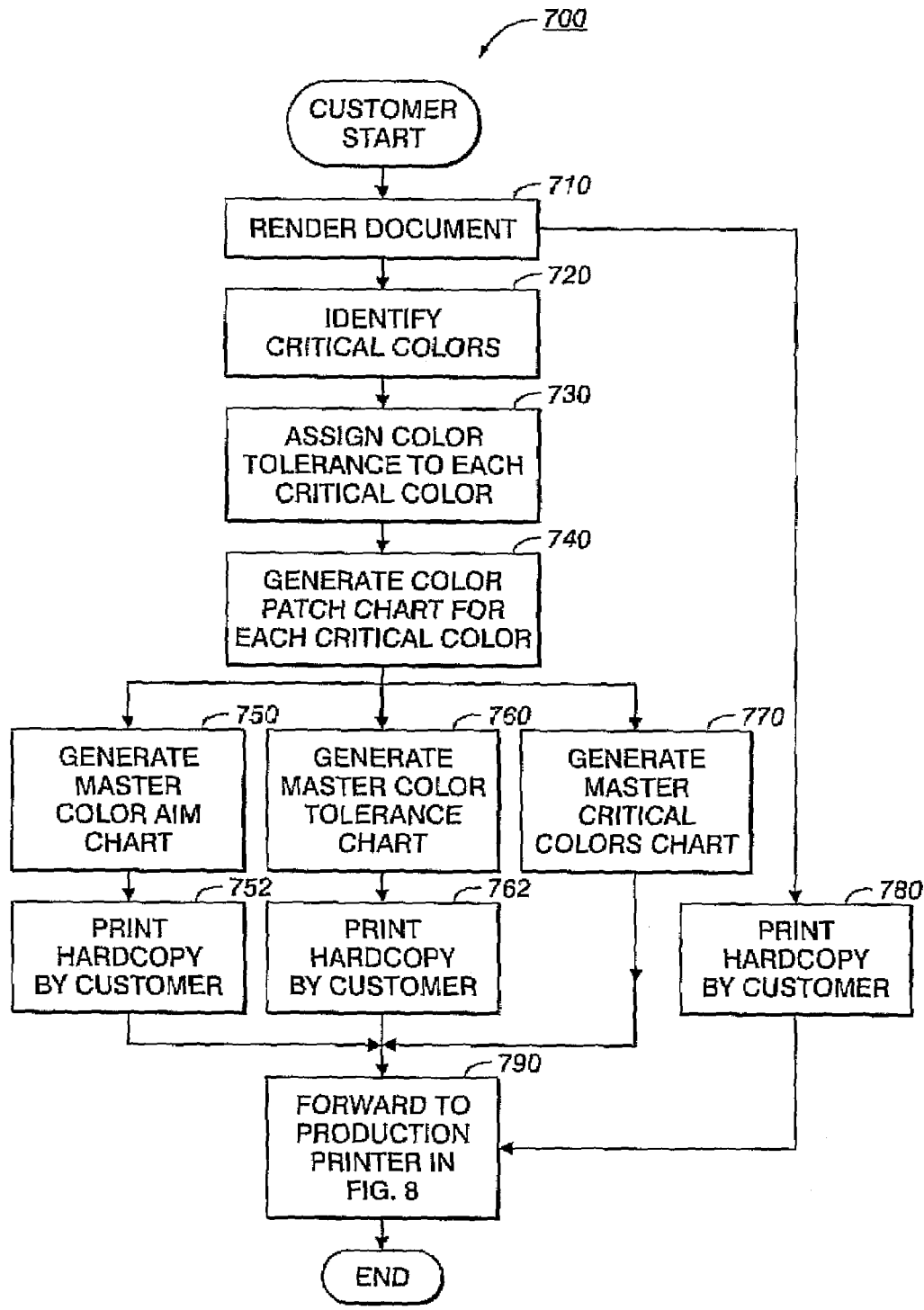
FIG. 7 depicts a flow chart in accordance with embodiments of the present teachings.
Figure 8:
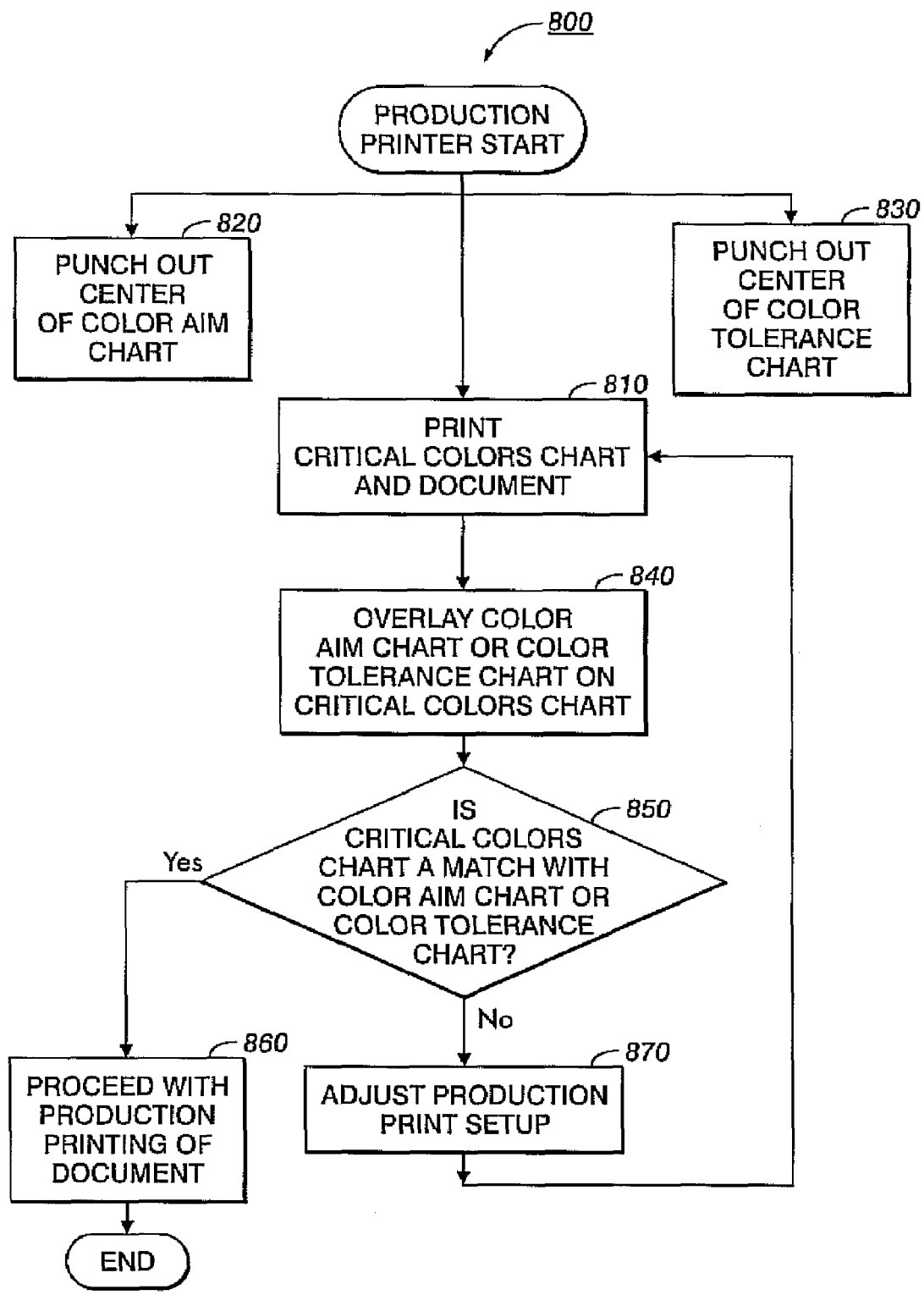
FIG. 8 depicts a flow chart in accordance with embodiments of the present teachings.

FIG. 1 depicts potential hardware and structure for implementing the exemplary embodiments of the invention. FIGS. 2 through 6 depict exemplary color charts for methods and system for selecting critical colors and corresponding critical color tolerances of the exemplary embodiments. FIGS. 7 and 8 depict a process implementing the color charts of FIGS. 2 through 6.

As used herein, the term "GUI" refers to graphic/graphical user interface.

As used herein, the term "PDF" refers to portable document format.

As used herein, the terms "C", "M", "Y" refer to color space defined by the subtractive primaries cyan, magenta and yellow, respectively. In printing, black (defined by "K") is added to make up for deficiencies in real-world CMY inks.

As used herein, the term "pixel" refers to an abbreviation for a picture element. A pixel is the smallest unit that can be sensed, manipulated, or output by a digital system or displayed on a computer screen. More pixels per inch mean higher resolution.

As used herein, the term "tolerance" refers to the amount of acceptable difference between a known correct standard (usually a customer's specifications) and a set of measured samples.

As used herein, the term "hue" refers to the property of color, for example, identifying colors such as red, yellow, green, and blue. Different hues are caused by different wavelengths of light.

As used herein, the terms "chromaticity" or "chroma" refer to a color's purity. This property of color identifies how pure a hue is. For example, there is no white, black, or gray present in a color that has high chroma.

As used herein, the term "luminance" or "lightness" refers to an amount of white or black in a color. For example, adding white to a color will increase lightness and adding black will decrease it.

As used herein, the terms "RGB", "CMYK", and "HSL" refer to different color systems used for different color conditions depending on how the color is created. When using projected light, RGB or red/green/blue, may be the governing system. For color that is mixed with paints, pigments or inks on fabric, paper, canvas or some other material, CMY or cyan/magenta/yellow, may be the color model. Because these pure pigments tend to be quite expensive, Black, symbolized by "K", may be substituted for equal parts of CMY to lower costs of ink. Another color system is HSL or hue/saturation/lightness. This system has many variants switching saturation with chroma, luminance with value etc. but is usually consistent with how the human eye sees color.

Referring to FIG. 1 through 8, exemplary apparatus and methods for enabling a customer to identify critical colors in a document and to specify tolerances limits acceptable in a final production run utilize the exemplary color charts described herein. It will be apparent that the color charts of FIGS. 2 through 6 are depicted by way of example and that the steps of the method and process may vary according to steps selected by a customer.

As used herein, a customer is intended to convey an entity preparing a source document for small or large reproduction by a production printer. As used herein, a production printer is intended to convey an entity other than the customer such as a printing company or a local on-demand printing system. It will be further apparent that an original document preparation and the production printing operation are distinct, and implementing a document proofing method as described herein will provide a printed product having a reproduction color within color tolerances set by the customer for the original document.

Referring first to FIG. 1, a document preparation and printing location, such as a personal computer workstation 100 is depicted. The workstation 100 may include all typical attributes of a work station including a monitor 110, a mouse 120, a keyboard 130, a CPU 140 including a processor and memory, and a printer 150. The monitor 110 enables viewing of a document by a user of the work station 100. It is expected that the viewable document may be prepared by any known method, including by the user or by downloading from a remote site due to preparation by another. The mouse 120 and keyboard 130 direct a cursor for interaction with the generated document on the user's monitor 110. The CPU 140 includes all programming and hardware necessary to enable operation of the workstation 100. The printer 150 functions to print documents visible on the monitor 110.

The CPU 140 further includes Color Selector software, the Color Selector software enabling the customer to interact with the document viewed in the monitor 110 in order to select critical colors within the document. An additional software component defined as a Target Builder may be provided to interact with the Color Selector software. It will be apparent that the Color Selector software and the Target Builder software may coexist as a unitary software program or may be separate software programs.

More specifically, the Color Selector software renders the document and displays it on the monitor 110, and enables a user to perform interactive document functions such as scrolling, zooming in, and zooming out of the document. Further, and referring to FIGS. 3 and 4, the Color Selector software enables the user to identify or tag a "critical color" of the document by clicking on a portion of the document. The critical color is a color identified by the customer as being a color within the document that the customer needs to have most accurately reproduced. The identified or tagged portion of the document may be a pixel on the document, or a general area of the document, such as a rectangular region encompassing a selected color. If a region of the document is selected, a critical color is created at a centroid of all of the colors in the selected region. Any number of critical colors may be selected by the user.

Figure 2:
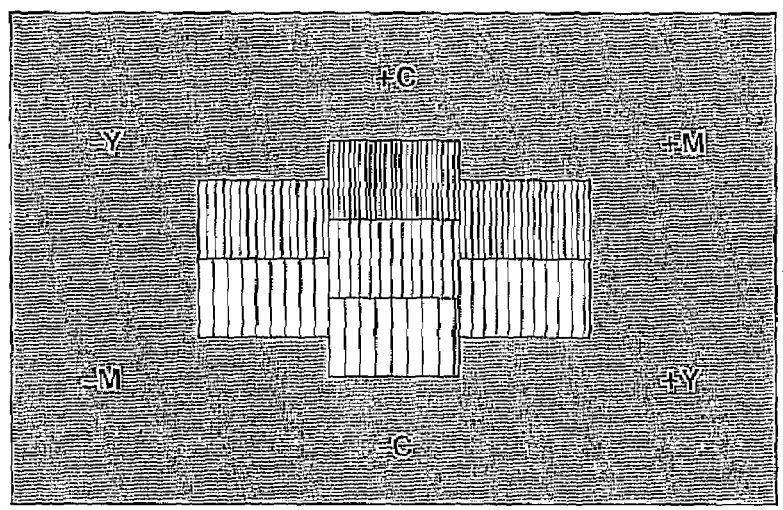
FIG. 2 depicts an exemplary user defined critical color and associated color tolerances in accordance with embodiments of the present teachings.
Figure 3:
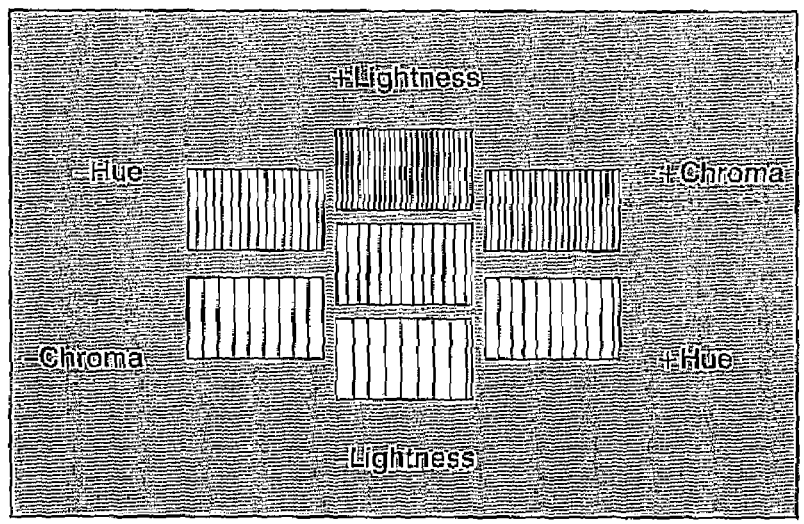
FIG. 3 depicts an alternative exemplary user defied critical color and associated color tolerances in accordance with embodiments of the present teachings.

One example for displaying the interactive critical color selection is depicted in FIG. 2. Another example for displaying the interactive critical color selection is depicted in FIG. 3. In FIG. 2, the surrounding color patches 210, 220, 230, 240, 250 and 260 appear as shades of the centroid (critical) color 200. In FIG. 3, the surrounding color patches 310, 320, 330, 340, 350 and 366 appear as shades of the central critical color 300, and are further defined by an outline and are set apart from the color 300. One or both of these views may be presented to the user. As each critical color is selected, a new window opens in the monitor 100. The new window includes the selected critical color in a central location of the window with a ring-around of color patches indicating a limit of color tolerances.

In order to obtain the array of color tolerances (the ring-around) for each of FIGS. 2 and 3, the user may assign the color tolerance level to the tagged portion of the document at the time of identifying the critical color. The assigned color tolerance level may be either a default color tolerance pre-set by the program or the user, or may be manually selected at the time of selecting a portion of the document.

More specifically, the default color tolerance level may be a common re-usable default tolerance that has been set in identified preferences for the application. Alternatively, acceptance of a default tolerance level may be dependent on the location of the color in color space. This method may be set up to assign tighter tolerances to important memory colors such as human skin, foliage or blue sky. Tighter tolerances may be assigned to neutrals and near neutrals than to highly saturated colors.

Further, a specific color error tolerance level may be assigned in the form of a color difference metric like $\Delta E^*$, $\Delta E_{94}^*$ or $\Delta E_{2000}^*$. Still further, specific color tolerances may be assigned to different perceptual attributes of the color such as $\Delta L^*$, $\Delta C^*$, $\Delta h_{ab}^*$, $\Delta a^*$ or $\Delta b^*$. Even further, specific color tolerances may be assigned to different process attributes of the color such as $\Delta C$, $\Delta M$, $\Delta Y$, $\Delta K$, $\Delta R$, $\Delta G$ or $\Delta B$.

Viewing of the selected critical color and the ring-around patches, such as shown in either of FIGS. 2 or 3, provide a visual feedback to the customer of the critical color along with the selected or default tolerances. The user may adjust the ring-around of color tolerances as desired.

Figure 4:
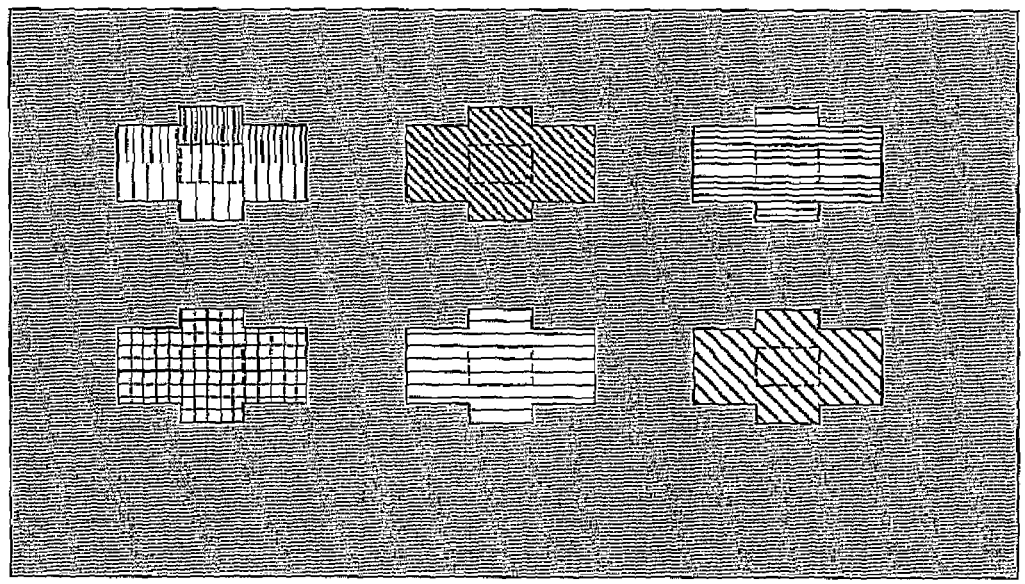
FIG. 4 depicts a program generated color tolerance chart in accordance with embodiments of the present teachings.

Upon completion of identification of the critical colors in a viewable document, the color selector software passes the critical color data, along with the refined and accepted ring-around of color tolerances, to the Target Builder software component in the CPU 140. The target builder software generates a predetermined number of master color charts as shown in FIGS. 4, 5, and 6. The master color charts are typically in a page description language such as Postscript™. By way of example, three master color charts are described in the following and illustrated in the Figures. Certain generated master color charts are appended to the document PDF file but tagged using a proprietary tag to indicate that they should only be printed during proofing and test printing at the production printer, or location of print setup operations.

The first exemplary chart created by the Target Builder software is a color tolerance chart as shown in FIG. 4. The color tolerance chart is essentially a master chart including individual patches of all identified critical colors at 410, 420, 430, 440, 450 and 460, each with a ring-around area 410a, 420a, 430a, 440a, 450a and 460a of accepted tolerance limits printed around each critical color patch. Again, the ring-around colors correspond to the color tolerance limits identified by the customer. In essence, the color tolerance chart, shown by way of example in FIG. 4, will identify the limits of mismatch for each critical color of a particular document.

The second exemplary chart created by the Target Builder software is a color aim chart as shown in FIG. 5. The color aim chart is essentially a master chart including individual patches all identified critical colors 510, 520, 530, 540, 550 and 560 and including a white or unprinted region 510a, 520a, 530a, 540a, 550a and 560a in the center of each critical color patch. The white or unprinted regions 510a, 520a, 530a, 540a, 550a and 560a are in the same page locations as the centers 410, 420, 430, 440, 450 and 460 of the ring-around color tolerances on the color tolerance chart of FIG. 4.

The third exemplary chart created by the Target Builder software is a critical colors chart as shown in FIG. 6. The critical colors chart is essentially a master chart including only individual patches of the critical colors as tagged by the user, and printed in the same page locations as, but slightly larger than, the center regions 410, 420, 430, 440, 450 and 460 of the color tolerance chart of FIG. 4 or the unprinted regions 510a, 520a, 530a, 540a, 550a and 560a of the color aim chart of FIG. 5.

In use, the color tolerance chart of FIG. 4 and the color aim chart of FIG. 5 are intended to be printed by the hardcopy proofer at the customer's printer. The customer printed proofs of the charts are submitted to the production printer along with a hardcopy proof of the original document, the as yet unprinted master critical colors chart of FIG. 6, and the PDF file containing all master charts and original document. The customer printed master charts communicate the critical color aims and tolerances of the customer to the production printer in a way that enables the production printer to make a direct visual evaluation of the master critical colors chart test print generated at the production printer to determine if it will meet the customer color tolerances.

In an exemplary embodiment, a punch out or similar removal of the center regions 410, 420, 430, 440, 450 and 460 of each critical color defined in the color tolerance chart of FIG. 4 and centers 510a, 520a, 530a, 540a, 550a and 560a of the color aim chart of FIG. 5 may be performed at a location of the dashed lines therein. The paper removal may be made by a paper punch (not shown) designed to perform this particular function and therefore correspond to the size of the center regions. When the production printer sets up his press and produces a test print of the critical colors chart of FIG. 6, both of the punched out color tolerance chart of FIG. 4 and the punched out color aim chart of FIG. 5 are overlaid on the FIG. 6 critical colors chart (printed at the production printer end) to determine how close the test print is to the customer color tolerances.

Although the method and system may be achieved by printing either the color tolerance chart of FIG. 4 or the color aim chart of FIG. 5 alone; this would provide a less complete specification of the customer intent than would be obtained using both charts. For example, if only the color aim chart of FIG. 5 were printed, then the production printer may need to guess how far he can deviate from the aim chart and still be acceptable to the customer. Likewise, if the color tolerance chart of FIG. 4 is used alone, the production printer will know when he has obtained colors that the customer will accept, but does not know exactly what the customer's "aims" are.

Referring to the flow charts of FIGS. 7 and 8, the series of events for each of the customer 700 and the production printer 800 are respectively illustrated. In FIG. 7, the customer starts the process by rendering an original document at 710 and utilizing the Color Selector program to tag critical colors within the document as at 720. The customer assigns a color tolerance to each tagged critical color at 730. When a color tolerance is assigned, the Color Selector program further displays the critical color at 740 along with the selected color tolerances for acceptance by the customer.

When the color tolerances for each critical color are accepted, the Target Builder program generates the master color aim chart at 750, the master color tolerance chart at 760, and the master critical colors chart at 770. As previously indicated, the master critical colors chart is also flagged for later printing by the production printer. Once the master color aim chart and color tolerance chart are generated, each of these charts are printed by the customer at 752, and 762, respectively. Further, a proof of the original document is printed by the customer at 780. Each of the flagged critical colors chart, printed original document, and printed master color aim and master color tolerance charts are forwarded to the production printer at 790.

Referring now to FIG. 8, upon receiving the printed and unprinted documents from the customer, the production printer prints the master critical colors chart at 810. If not already done, the production printer also punches out the centers of the separated colors on each of the master color aim chart at 820 and master color tolerance chart at 830. The production printer then overlays each of the master color aim chart and master color tolerance chart over the master critical colors chart at 840 to visually determine at 850 if the critical colors chart is within the tolerances of the master color aim chart and master color tolerances chart. If the answer is YES, then the production printer may proceed with production printing of the original document at 860. If NO, then the production printer may make adjustments to the production print setup at 870 to better comply with the assigned color tolerances. Once adjustments have been made, the process returns to the printing of the master critical colors chart at 810 to repeat the above steps until an acceptable tolerance is met by the production printer.

There are numerous advantages to the exemplary embodiments including providing a simple and clear communication of color requirements from a customer to the production printer. Specifically, the customer may specify to the production printer which colors in a document are most critical to the customer for that particular document and provide a visual reference for use by the printer. The method removes any ambiguity by providing hardcopy color patches to the production printer for use in producing an accurate final product.

While the invention has been illustrated with respect to one or more exemplary embodiments, alterations and/or modifications can be made to the illustrated examples without departing form the spirit and scope of the appended claims. In addition, while a particular feature of the invention may have been disclosed with respect to only one of several embodiments such feature may be combined with one or more other features of the other embodiments as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." And as used herein, the term "one or more of" with respect to a listing of items such as, for example, "one or more of A and B," means A alone, B alone, or A and B.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of identifying color tolerances in a pre-press document comprising:
   providing an interactive graphical user interface;
   viewing the pre-press document in the graphical user interface;
   tagging selected portions of the document containing a critical color;
   assigning a color accuracy tolerance level for each of the tagged critical colors;
   accepting the assigned color accuracy tolerance levels for each of the tagged critical colors;
   generating a series of color charts in response to accepting the assigned color accuracy tolerance levels, the series of generated color charts including a master color tolerance chart, a master color aim chart, and a master critical colors chart, the master charts each including all of the tagged critical colors of the document; and
   printing a hard copy of each of the master color tolerance chart and master color aim chart at a first printer; and
   printing a hard copy of the master critical colors chart at a second printer.

2. The method of claim 1, wherein selected portions of the document include a pixel and a predetermined region.

3. The method of claim 1, further comprising generating the viewable document, enabling manipulation of the document on the interactive graphical user interface, and generating said master color charts.

4. The method of claim 1, wherein assigning the color accuracy tolerance level includes selecting a level of color tolerance for a tagged portion of the document.

5. The method of claim 1, wherein assigning the color accuracy tolerance level includes selecting a user defined default tolerance level for a tagged portion of the document.

6. The method of claim 1, wherein the master color tolerance chart includes all tagged critical colors with a ring-around displayed around each critical color the ring-around indicating acceptable tolerance limits for color mismatch for each critical color in a production print run.

7. The method of claim 6, wherein a predetermined center of each tagged critical color aligns with a corresponding center of each critical color of the master critical colors chart and wherein each predetermined center includes a removable portion to define a window therein.

8. The method of claim 7, wherein the master color aim chart includes patches of critical colors with a blank region in a defined center of each patch.

9. The method of claim 8, wherein the blank regions align with a corresponding center of each critical color of the master critical colors chart and wherein each blank region is removable to define a window therein.

10. The method of claim 9, wherein the critical colors of said master critical colors chart printed on said second printer are viewable through the corresponding windows on said master color aim chart printed on said first printer.

11. The method of claim 10, wherein overlaying said master charts visually indicates if the master color tolerance chart is within tolerances of said master critical colors chart.

12. The method of claim 7, wherein the critical colors of said master critical colors chart printed on said second printer are viewable through the corresponding windows on said master color tolerance chart printed on said first printer.

13. The method of claim 12, wherein overlaying said master charts visually indicates if the master color tolerances chart is within limits of said master critical colors chart.

14. A system for accurately communicating color requirements from a customer to a production printer comprising:

a customer end computer workstation including a monitor, a processor, and a printer, wherein the processor is configured to execute:

a color selector for enabling display of an interactive original document on said monitor;

a tool for navigating the displayed original document and tagging at least one critical color of the displayed document;

said color selector further enabling selection of a color tolerance in connection with each tagged critical color of the displayed document; and a target builder, responsive to selection of a color tolerance for each critical color, for creating a series of color charts including a master critical colors chart displaying only the tagged critical colors for the original document, a master color aim chart, and a master color tolerance chart corresponding to critical colors and their associated color tolerances identified in the displayed document; and a production end printer for printing at least the critical colors chart and the original document;

said customer printer printing at least the master color aim chart and the master color tolerance chart, the customer printed charts compared to the production end printed chart for visually determining if the critical colors chart is within the selected color tolerances of the customer printed charts.

15. The system of claim 14, wherein assigning the color accuracy tolerance level includes selecting one of a level of color tolerance for a tagged portion of the document and a user defined default tolerance level for a tagged portion of the document.

16. The system of claim 14, wherein the master color tolerance chart includes all tagged critical colors with a ring-around displayed around each critical color, the ring-around indicating acceptable tolerance limits for color mismatch for each critical color in a production print run, a predetermined center of each tagged critical color including a removable portion to define a window therein.

17. The system of claim 16, wherein the master color aim chart includes patches of critical colors with a blank region in a defined center of each patch, the blank region aligning with a corresponding critical color of the master critical colors chart, the blank region removable to define a window therein.

18. The system of claim 17, wherein the critical colors of said master critical colors chart printed on said second printer are viewable through an aligned corresponding window of said master color aim chart printed on said first printer.

19. The system of claim 16, wherein the critical colors of said master critical colors chart printed on said second printer are viewable through an aligned corresponding window of said master color tolerance chart printed on said first printer.

20. The system of claim 14, wherein selected portions of the document include a pixel and a predetermined region.

\* \* \* \* \*